United States Patent
Kuta et al.

(10) Patent No.: US 12,450,942 B2
(45) Date of Patent: Oct. 21, 2025

(54) SYSTEM AND METHOD FOR PERFORMING FACE RECOGNITION

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Yoav Hacohen, Jerusalem (IL); Matan Ben Yosef, Korazim (IL); Or Gorodissky, Tel Aviv (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 389 days.

(21) Appl. No.: 17/785,445

(22) PCT Filed: Dec. 14, 2020

(86) PCT No.: PCT/IL2020/051286
§ 371 (c)(1),
(2) Date: Jun. 15, 2022

(87) PCT Pub. No.: WO2021/124320
PCT Pub. Date: Jun. 24, 2021

(65) Prior Publication Data
US 2023/0023148 A1    Jan. 26, 2023

Related U.S. Application Data

(60) Provisional application No. 62/948,386, filed on Dec. 16, 2019.

(51) Int. Cl.
*G06V 40/16*    (2022.01)
*G06V 10/77*    (2022.01)
(Continued)

(52) U.S. Cl.
CPC ........ *G06V 40/172* (2022.01); *G06V 10/7715* (2022.01); *G06V 10/7747* (2022.01); *G06V 10/776* (2022.01); *G06V 40/171* (2022.01)

(58) Field of Classification Search
None
See application file for complete search history.

(56) References Cited

U.S. PATENT DOCUMENTS

2022/0100988 A1* 3/2022 Yamamoto ........... G06V 40/172

FOREIGN PATENT DOCUMENTS

KR        102123248        6/2020

OTHER PUBLICATIONS

Ren, Zhongzheng; Lee, Yong Jae; Ryoo. Learning to Anonymize Faces for Privacy Preserving Action Detection. Eprint arXiv:1803.11556 (Jul. 26, 2018) [online], retrieved from: <https://arxiv.org/pdf/1803.11556.pdf> Jul. 26, 2018.

(Continued)

*Primary Examiner* — David Ometz
(74) *Attorney, Agent, or Firm* — PEARL COHEN ZEDEK LATZER BARATZ LLP

(57) ABSTRACT

A system and a method of performing face recognition may include: receiving a first facial image, depicting a first face, and a second facial image depicting a second face; applying an ML model on the first image, to produce a first representation vector, and applying the ML model on the second image to produce a second representation vector; comparing the first representation vector and the second representation vector; and associating the first face with the second face based on the comparison, where the ML model is trained to produce the representation vectors from the facial images, based on regions in the facial images that correspond to distinctiveness scores that are beneath a distinctiveness threshold.

17 Claims, 6 Drawing Sheets

(51) Int. Cl.
*G06V 10/774* (2022.01)
*G06V 10/776* (2022.01)

(56) References Cited

OTHER PUBLICATIONS

Letournel, Geoffrey; Bugeau, Aur?lie; Ta, Vinh-Thong; Domenger, Jean-Philippe. Face Deidentification with Expressions Preservations. International Conference on Image Processing (ICIP) 2015, Sep. 2015, Quebec, Canada. ffhal-01187654f [online]. [retrieved on Mar. 16, 2021]. retrieved from: <https://hal.archives-ouvertes.fr/hal-01187654/document> Sep. 30, 2015.
Search Report of Application No. PCT/IL2020/051286 mailed on Mar. 18, 2021.
Sendik et al: "What's in a face? Metric Learning for Face Characterization" Computer Graphics Forum, 2019.

* cited by examiner

SYSTEM AND METHOD FOR PERFORMING FACE RECOGNITION

CROSS-REFERENCE TO RELATED APPLICATIONS

This application is a National Phase Application of PCT International Application No. PCT/IL2020/051286, International Filing Date Dec. 14, 2020, published as WO 2021/124320 and entitled System and Method for Performing Face Recognition claiming the benefit of U.S. Provisional Patent Application No. 62/948,386, filed Dec. 16, 2019, which is hereby incorporated by reference.

FIELD OF THE INVENTION

The present invention relates generally to the field of image processing. More specifically, the present invention relates to recognizing deidentified media data elements.

BACKGROUND OF THE INVENTION

The dramatic progress of machine learning in recent years and the ease of facial recognition have raised privacy concerns which encourage the development of methods for deidentification of facial images in order to avoid unauthorized or unwanted facial recognition. However, such methods of deidentification might also be maliciously used for overcoming critical security checks, copyright infringements, fake news, etc.

Currently available methods for deidentification of facial images may include adversarial noise or more semantic manipulation of the facial image.

It has been shown by Sendik et. al. (O. Sendik, D. Lischinski, D. Cohen-Or: "What's in a face? Metric Learning for Face Characterization", Computer Graphics Forum, 2019), that facial recognition systems typically rely on specific characterized features in faces more than other regions in the face. For example, some regions in the face may be used more often than others by facial recognition system to distinguish between people.

Therefore, currently available methods for deidentification of faces that are optimized for preserving similarity to the original image while reducing the accuracy of a face recognition (FR) system, aim to change only the necessary regions in the face while preserving the rest of the face as similar as possible to the original one.

Deidentification of data elements such as images and/or video sequences (e.g., a series of images adapted, when presented in sequence, to produce a moving image) may be regarded by a person skilled in the art as a special case of adversarial attacks, a broad family of methods for manipulating data elements in a way that is likely to change a prediction of machine learning (ML) based classifiers on the manipulated images. For example, adversarial attacks against ML-based classifiers such as a FR classifier may include modifying an input image that includes a human face, so as to cause the FR classifiers to fail in recognizing an identity of a person depicted in the input image.

Approaches for protecting against adversarial attacks may include, for example: training a classifier with adversarial inputs in addition to real inputs; training the classifier while encouraging proximity between intermediate layers for similar input images; training the classifier while performing defensive distillation; performing dimensionality reduction on incoming images; applying various types of pre-processing and/or filtering on incoming images; performing noise reduction on incoming images and the like.

These methods may be effective for adversarial attacks of generic media types, e.g., not specific to any category, such as facial images. However, currently available deidentification methods that target facial images tend to manipulate these images in a more semantic manner than generic adversarial attacks. In addition, currently available deidentification methods tend to condense more changes at regions that are usually in the focus of FR systems and/or human observers.

SUMMARY OF THE INVENTION

The term "neural network" (NN), e.g. a NN implementing machine learning, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

Embodiments of the invention may include a method of recognizing deidentified media data elements, such as images and/or video data elements.

Embodiments of the invention may be applied to media data elements (e.g., images, video sequences, etc.) to recognize a depicted face, and overcome or bypass deidentification of facial images.

The terms "recognition" and "identification" may be used in this context interchangeably, for example to refer to an ability to associate a depicted face with an identity of a corresponding person (e.g., of a plurality of people). The term 'overcome' may be used in this context to refer to an ability to correctly identify a person that may be included or depicted in a media data element such as an image or a video sequence, even if the representation of the person's face in the media data element has been altered by a deidentification process.

Embodiments of the invention may include a learning-based face recognition (FR) engine, trained to recognize faces from facial features that are usually ignored or weighted lower than other characterizing features.

Embodiments of the invention may include a FR component, adapted to identify highly distinctive, or characterizing regions of a facial image, such as specific facial features or organs (e.g., nose, eyes, etc.), as suggested by Sendik et. al. the result of this process may be a binary or non-binary distinctiveness map that may be aligned with the input face, as elaborated herein (e.g., in relation to FIG. 2). The distinctiveness map may include, for example, a score of one or more (e.g., all) regions or pixels in a facial image. This score may correspond to a level in which the respective region or pixel is distinctive, or prominent in the identification of the corresponding face.

As known by persons skilled in the art, currently available algorithms for deidentification of facial images typically target regions that highly characterize, or are highly distinctive of an input facial image, to achieve maximal deidentification by applying minimal actual modification or manipulation to the input facial image. In other words, by performing minimal modifications to highly distinctive regions of an input image depicting a first face, currently available deidentification algorithms may produce a second image depicting a second face, that may have low probability of being correctly identified, e.g., by a human observer or by an FR algorithm, as pertaining to the same, first face.

Embodiments of the invention may include a training step in which regions that are identified as highly distinctive, or characterizing of the input facial image (e.g., regions having a high score in the corresponding distinctiveness map) are blackened or masked out to be ignored. It may be appreciated that ignoring such regions may bypass manipulation that may have been performed by a deidentification algorithm, and may thus enable embodiments of the invention to overcome such manipulations.

Additionally, or alternatively, embodiments of the invention may include a training step in which regions that are identified as highly characterizing are replaced or blended-in by respective regions of another facial image including another synthesized or real face.

Embodiments of the invention may include averaging distinctiveness maps from a plurality of related or non-related facial images after alignment to a reference geometry to produce an averaged distinctiveness map, and applying the averaged distinctiveness map to one or more (e.g., all) facial images of the plurality of facial images. Alternatively, the distinctiveness map may be predicted or produced for each input image, and may be individually applied on each respective input facial image.

Embodiments of the present invention may transform input facial images that may, or may not have been manipulated (e.g., by a deidentification process) into representation vectors that represent an identity of a person depicted therein. The representation vectors may then be compared with other representation vectors, corresponding to other, manipulated or non-manipulated facial images. The result of such comparison may be correlated with a probability that the original images (e.g., before manipulation) depict the same people.

Additionally, or alternatively, embodiments of the present invention may be trained so that the representation vectors, (e.g., representing or corresponding to an identity of a depicted person) may be achieved indirectly. For example, the FR model may be trained by using a Softmax loss function for distinguishing between identities of people within a closed, predefined set of facial images (e.g., a set of people of a specific gender, a set of people of a specific ethnicity, etc.). Following the training stage, an intermediate layer of FR model may be used as a representation vector for comparing between two faces.

It may be appreciated that while this approach may be sub-optimal in terms of accuracy of identifying non-manipulated images, it may be more robust in overcoming deidentification, and may provide high accuracy-rates in recognizing deidentified facial images.

Embodiments of the invention may include a method of training, by one or more processors (e.g., element 2 of FIG. 1) a machine learning model to recognize deidentified data elements. Embodiments of the method may include: (a) receiving a first data element representing an image, that includes a first face; (b) analyzing the first data element to produce a distinctiveness map; (c) performing one or more modifications of the first data element based on the distinctiveness map, to produce one or more second data elements, such as images that may include or depict one or more second faces; (d) repeating steps (a) through (c) to produce a training set that may include a plurality of first data elements (e.g., original facial images) and a plurality of second data elements (e.g., modified facial images); (e) based on the training set, training an ML model to produce a new data element (a new facial image), such as a new facial image that may represent, include or depict a new face.

Embodiments of the invention may transform the new data element (e.g., the new facial image) to a first output vector representing an identity of a person depicted in the first face. Embodiments of the invention may also transform one or more repository data elements, such as facial images of an image repository, to one or more respective, second output vectors representing identity people depicted in the repository facial images. Embodiments of the invention may compare, by any appropriate comparison metric (e.g., an L1 metric, an L2 metric, etc.) between the first output vector and the one or more second output vectors, to identify, or recognize the identity of a person depicted in the first, original facial image from a plurality of people depicted in the image repository images.

Embodiments of the invention may include, during an inference stage: receiving two or more data elements from beyond the training set, representing images may include two or more new faces, and inferring the trained model on each of the two or more data elements to produce two or more output vectors corresponding to identities of each new face. Embodiments may compare between two output vectors of the two or more output vectors, and based on the comparison, determine the probability that the two output vectors correspond to the same person.

According to some embodiments, analyzing the first data element may include: identifying one or more regions in the face of the first data element; using a facial recognition system to determine a level of distinctiveness of each identified region in relation to the first face; and assigning a score to each region based on the level of distinctiveness, to produce the distinctiveness map.

According to some embodiments, producing the second data element may include omitting one or more regions of the first face that correspond to the highest scored regions in the distinctiveness map.

Omitting the one or more regions of the first face may include, for example: masking-out the one or more regions in the face of the first data element; replacing the one or more regions in the face of the first data element with respective regions of another face, represented by another data element; and performing one or more graphical modifications to the one or more regions in the face of the first data element.

According to some embodiments, assigning a score to one or more regions may include: assigning a score to one or more regions of a face of the plurality of first data elements; averaging the scores of corresponding regions of the faces of the plurality of first data elements; and producing a distinctiveness map that corresponds to the average score of regions of faces the plurality of first data elements.

Embodiments of the present invention may include a system for training a machine learning model, to recognize deidentified data elements. Embodiments of the system may include: a non-transitory memory device, wherein modules of instruction code may be stored, and a processor associated with the memory device, and configured to execute the modules of instruction code.

Upon execution of said modules of instruction code, the processor may be further configured to: (a) receive a first data element representing an image that may include a first face; (b) analyze the first data element to produce a distinctiveness map; (c) perform one or more modifications of the first data element based on the distinctiveness map, to produce one or more second data elements, representing images may include one or more second faces; (d) repeat steps (a) through (c) to produce a training set that may include a plurality of first data elements and a plurality of second data elements.

Based on the training set, the processor may train an ML model to: receive a new data element that may represent or include an image, depicting a new face. The processor may then transform the new data element to an output vector representing an identity of a person depicted in the new face.

Embodiments of the present invention may include a system for performing face recognition. Embodiments of the system may include: a non-transitory memory device storing instruction code and a processor associated with the memory device, and configured to execute the instruction code. Upon execution of said modules of instruction code, the processor may be configured to receive a distinctiveness map, associating a distinctiveness score to one or more regions in an image depicting a face. The distinctiveness score may correspond to prominence of an associated region in a process of identification of the face by a face recognition algorithm.

The processor may subsequently: select one or more regions of the face, that may be associated with a distinctiveness score that is higher than the lowest distinctiveness score, based on the distinctiveness map; modify the image at the one or more selected regions, to produce one or more modified images; and utilize an ML model, trained to recognize the face, based on the one or more modified facial images.

Embodiments of the present invention may include a method of training an ML model to recognize a face. Embodiments of the method may include: receiving a first image depicting a first face; obtaining a distinctiveness map, associating a distinctiveness score to one or more regions in the first face; selecting one or more regions of the first face, that may be associated with a distinctiveness score that may be higher than the lowest distinctiveness score, based on the distinctiveness map; performing one or more modifications of the selected one or more regions of the first image, to produce one or more modified images; and training the ML model to recognize the depicted face, using the one or more modified images as a training dataset, and using the first image as supervisory data.

According to some embodiments, obtaining a distinctiveness map may include: (a) identifying one or more regions in the first face; (b) using a facial recognition system to determine a distinctiveness score of each identified region in relation to the first face; and (c) assigning a score to each identified region, based on the distinctiveness score, to produce the distinctiveness map.

According to some embodiments, steps (a) through (c) may be repeated with a plurality of facial images, to obtain a respective plurality of distinctiveness maps. Subsequently, embodiments of the invention may align the plurality of distinctiveness maps according to a reference geometry, and average the scores of corresponding regions of the plurality of distinctiveness maps, to produce an averaged distinctiveness map. According to some embodiments, and wherein selection of the one or more regions of the first face may be based on the averaged distinctiveness map, e.g., based on distinctiveness scores corresponding to a plurality of images.

According to some embodiments, performing one or more modifications of the selected one or more regions may include omitting one or more regions of the first face that correspond to the highest scored regions in the distinctiveness map.

Additionally, or alternatively, performing one or more modifications of the selected one or more regions may include: receiving a second image depicting a second face; and replacing one or more regions of the first face, that correspond to the highest scored regions in the distinctiveness map, with corresponding regions of the second face.

Additionally, or alternatively, performing one or more modifications of the selected one or more regions may include applying one or more graphical modifications to one or more regions of the first face that correspond to the highest scored regions in the distinctiveness map.

According to some embodiments, during an inference stage, embodiments of the inventions may be configured to: receive a source image depicting a source face and one or more target images depicting one or more respective target faces; infer the trained ML model on the source image to produce a source representation vector; infer the trained ML model on the one or more target images, to produce one or more respective target representation vectors; compare between the source representation vector and at least one target representation vector; and based on the comparison, determine the probability that the source representation vector and the at least one target representation vector correspond to the same face.

Embodiments of the present invention may include a method of performing FR by at least one processor. Embodiments of the method may include: receiving a first facial image, depicting a first face, and a second facial image depicting a second face; applying an ML model on the first image, to produce a first representation vector, and applying the ML model on the second image to produce a second representation vector; comparing the first representation vector and the second representation vector; and associating the first face with the second face based on the comparison, According to some embodiments, the ML model may be trained to produce the representation vectors from the facial images, based on regions in the facial images that correspond to distinctiveness scores that may be beneath a distinctiveness threshold.

According to some embodiments, the ML model may be trained by: receiving a first image depicting a face; obtaining a distinctiveness map, associating a distinctiveness score to one or more regions in the depicted face (e.g., corresponds to prominence of an associated region, in a process of identification of the face by an FR algorithm); selecting one or more regions of the face, that may be associated with a distinctiveness score higher than the lowest distinctiveness score, based on the distinctiveness map; performing at least one modification of the first image, to produce one or more second images may include modified versions of the selected regions; providing the one or more second images as a training dataset to the ML model; and training the ML model to recognize the depicted face, using the first image as supervisory input.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
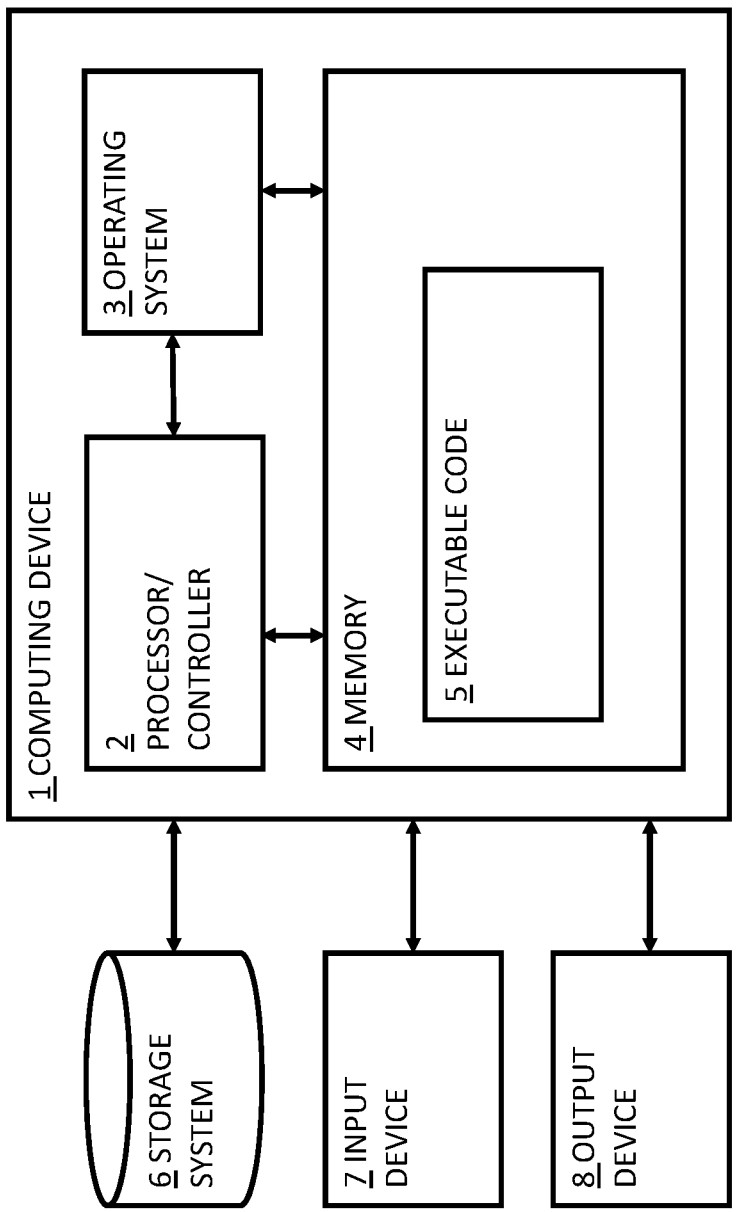
FIG. 1 is a block diagram, depicting a computing device which may be included in a system for recognizing deidentified data elements, such as deidentified facial images, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for recognizing deidentified data elements such as deidentified facial images, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc.

may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may recognize deidentified data elements (e.g., by determining whether an image data element has undergone an adversarial attack), as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more image data elements may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
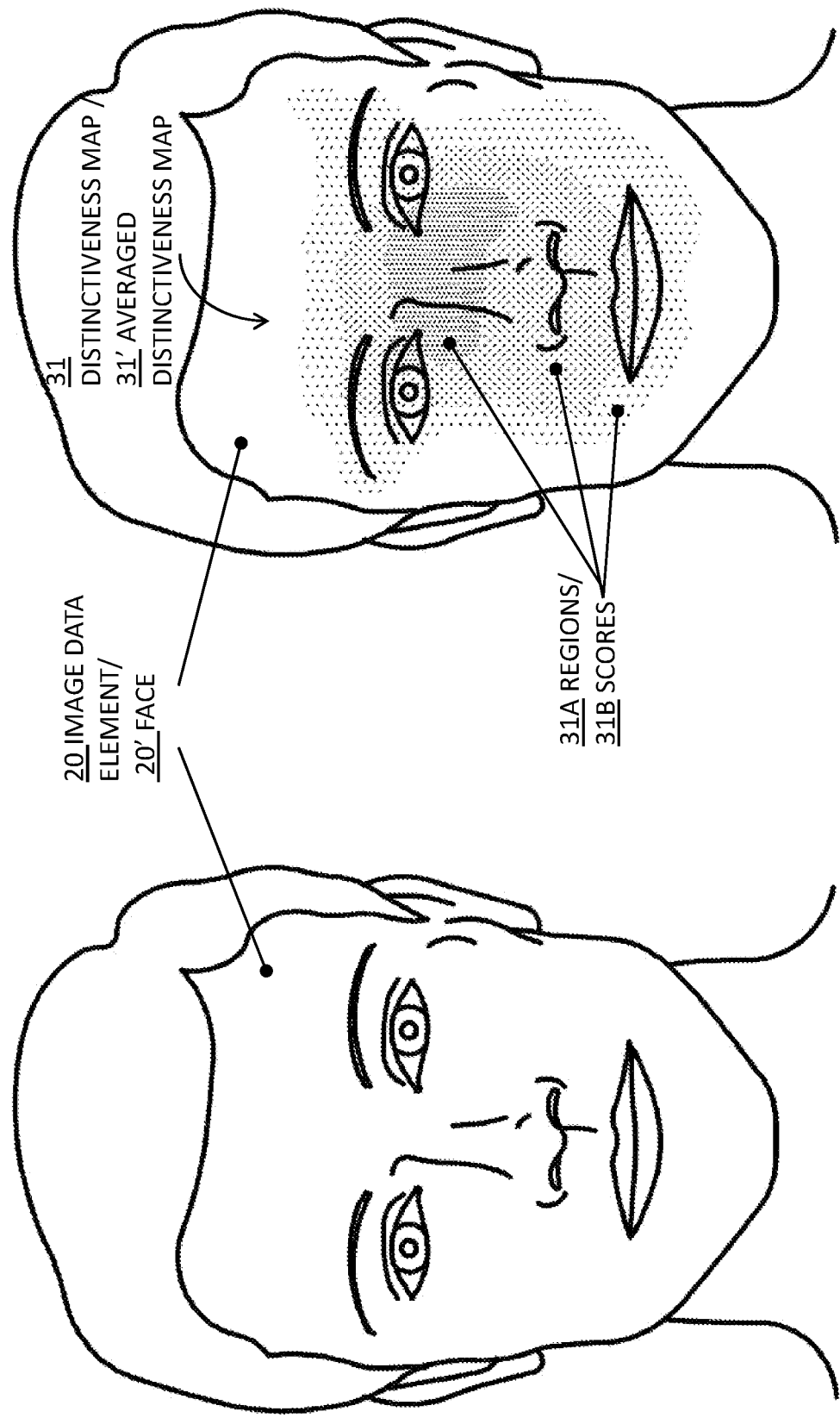
FIG. 2 is a composite image, showing a facial image and a corresponding distinctiveness map.

Reference is now made to FIG. 2 which depicts a facial image 20, depicting a face 20', alongside a corresponding map of distinctiveness 31 (or averaged map of distinctiveness 31', as elaborated herein).

The term 'distinctiveness' may be used herein to indicate a quality of one or more regions 31A of face 20' that may be included in image 20, and may be analyzed by embodiments of the invention as elaborated herein. According to some embodiments, distinctiveness map 31 may associate a distinctiveness score, or a distinctiveness level 31B to one or more regions 31A in depicted face 20'. The terms "distinctiveness score" and "distinctiveness level" may be used herein interchangeably, and may correspond to, or represent a prominence of an associated region 31A in a process of identification of face 20 (e.g., by an FR algorithm, by a human observer, and the like).

For example, a region 31A of face 20' may include any facial feature or organ such as a nose, an eye, a mouth, an ear, hair, facial hair, a portion thereof and/or a combination thereof. The score or level of distinctiveness 31B of a region 31A may refer to an amount in which region 31A distinctly characterizes the respective face. For example, it may be expected that a region that includes a unique facial feature (e.g., an exceptionally large nose or irregularly shaped lips) may be associated with a high level or a high score of distinctiveness, whereas regions that do not contain such unique facial features (e.g., featureless, smooth portions of a forehead) may be associated with a low level or score of distinctiveness.

As shown in FIG. 2, and as elaborated herein, the levels of distinctiveness 31B of each identified region 31A may be presented by a numerical value of distinctiveness scores in distinctiveness map 31. In the example of FIG. 2, the distinctiveness maps are graphically presented as a textured image, where regions 31A associated with high levels or scores of distinctiveness 31B are represented by one texture, and regions 31A associated with low levels or scores of distinctiveness are represented by another texture.

Figure 3:
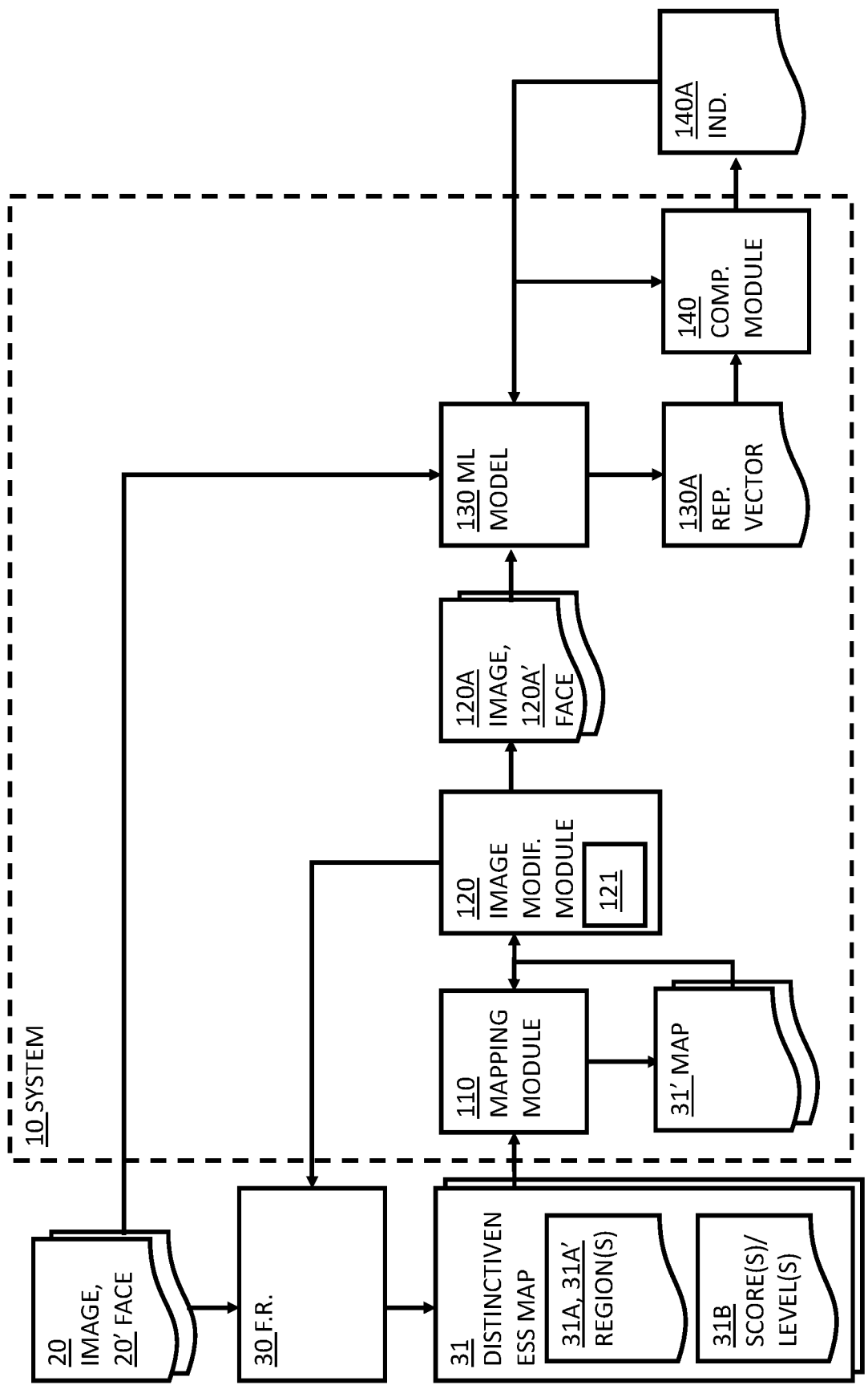
FIG. 3 is a block diagram, depicting a system for recognizing deidentified data elements such as deidentified facial images, during a training stage, according to some embodiments.

Reference is now made to FIG. 3, which is a block diagram, depicting a system 10 for recognizing deidentified data elements such as deidentified facial images during a training stage, according to some embodiments of the invention. As elaborated herein, training of one or more components of system 10 may enable embodiments of system 10 to overcome deidentification of an image data element.

According to some embodiments, system 10 may be implemented as a software module, a hardware module or any combination thereof. For example, system 10 may be or may include a computing device such as computing device 1 of FIG. 1, and may be adapted to execute one or more modules of executable code (e.g., element 5 of FIG. 1) on at least one processing unit (e.g., processor 2 of FIG. 1) to recognizing deidentified data elements, as described herein.

As shown in FIG. 3, system 10 may receive a data element 20 representing an image that may include, or depict a first face 20'.

According to some embodiments, system 10 may be associated with a FR module 30, adapted to analyze the input data element 20 to segment or identify one or more regions 31A of face 20', and determine a corresponding level of distinctiveness 31B of one or more (e.g., each) identified region 31A in relation to face 20'. For example, distinctiveness map 31 may be, or may include a data structure (e.g., a table) that may include a plurality of entries, where each entry of distinctiveness map 31 may include an association between one or more regions 31A and a corresponding score 31B.

As elaborated for example by Sendik et. al, FR module 30 may assign or associate a score 31B to one or more (e.g., all) regions 31A, based on the level of distinctiveness. These scores may then be aligned to, or correlated to face 20, to produce distinctiveness map 31, e.g., as depicted in the example of FIG. 2. In other words, the distinctiveness score 31B may correspond to prominence of an associated region 31A in a process of identification of the face by FR algorithm or module 30.

Additionally, or alternatively, system 10 may include a FR module 30, and may thus be adapted to receive one or more image data elements 20 depicting a face 20' and produce distinctiveness map 31 therefrom.

According to some embodiments, FR module 30 may produce or obtain distinctiveness map through an iterative process, by which specific regions in face 20' are segmented and their distinctiveness score is calculated.

For example, in a first iteration, FR module 30 may identify or segment one or more regions 31A (e.g., a mouth) in the face 20' of an image data element 20. FR module 30 may apply a change on the identified region of image data element 20, such as omitting or masking region 31A (e.g., the mouth) from face 20'. FR module 30 may then use a facial recognition algorithm to determine a probability that the modified face depicted in the modified image data element pertains to the same face as face 20' depicted in image data element 20. FR module 30 may assign a distinctiveness score 31B to the segmented or identified region 31A in relation to the depicted face 20', where a higher distinctiveness score 31B corresponds to a lower probability that the modified face pertains to the same person depicted in face 20'. In subsequent iterations, FR module 30 may continue to assign a distinctiveness score 31B to each identified region 31A. Finally, FR module 30 may produce distinctiveness map 31 based on the distinctiveness scores 31B of the segmented or identified regions 31A.

It may be appreciated by a person skilled in the art that a distinctiveness map 31 produced by an ML-based FR module 30 may not be comprehensible by a human observer, or may not reflect the same distinctiveness as may be expected by a human observer. However, for the purpose of clarification, or for providing better intuition of the content of distinctiveness map 31, it may be appreciated that a region 31A of face 20' that is unique for a specific person (e.g., a unique nose, an irregular lip, a scar, etc.) may be associated with a high distinctiveness score 31B numerical value, whereas a non-distinctive region (e.g., a smooth forehead) may be associated with a low distinctiveness score numerical value. Additionally, specific regions 31A (e.g., the nose bridge, the eyes) may be assigned a high distinctiveness score 31B numerical value across a population of people, or a plurality of depicted faces 20', whereas other regions 31A (e.g., cheeks) may be assigned a low distinctiveness score 31B numerical value across a population of people, or a plurality of depicted faces 20'.

According to some embodiments, FR module 30 may repeat the process described above with a plurality of facial image data elements 20, to obtain a respective plurality of distinctiveness maps 31. For example, FR module 30 may receive a plurality of image data elements 20 (e.g., a video stream data element 20) depicting a specific face (e.g., a specific person), and may produce a respective plurality of distinctiveness maps 31 as elaborated above.

According to some embodiments, system 10 may include a mapping module 110, adapted to produce a common distinctiveness map 31', that corresponds to a plurality of image data elements 20 such as images of a training dataset.

According to some embodiments, FR module 30 may segment or identify one or more regions 31A of a first face 20' depicted in a first image data element 20, and determine a corresponding score 31B, or level of distinctiveness, for each identified region 31A of first face 20', to obtain a distinctiveness map 31 corresponding to first image 20. FR module 30 may repeat the process of obtaining distinctiveness maps with a plurality of facial images. For example, FR module 30 may do the same for one or more second image data elements 20, to obtain a plurality of respective distinctiveness maps 31.

Mapping module 110 may subsequently produce a common distinctiveness map 31' that is composite, or corresponds to a plurality of image data elements, e.g., first image 20 and/or the one or more second image data elements 20.

For example, mapping module 110 may align or register the plurality of distinctiveness maps according to a reference geometry, and then average the scores 31B of corresponding regions 31A of the plurality of image data elements 20, to produce an averaged or common distinctiveness map 31'. In other words, mapping module 110 may produce a common (e.g., relating to a plurality of images 20) or averaged distinctiveness map 31' that includes an average score 31B of corresponding regions 31A of the plurality of faces 20'. In such embodiments, system 10 may utilize the common distinctiveness map 31' in relation to one or more (e.g., all) of the input facial image data elements 20.

The term "reference geometry" may be used in this context to refer to a common set of locations or positions, to which the plurality of image data elements 20 may be aligned. For example, a reference geometry may be a set of locations or landmarks in a preselected facial image, such as location of the pupils, an edge of a nose, an edge of an eyebrow, etc. The plurality of distinctiveness maps may be modified or warped, by any known algorithm, so as to be aligned to the same set of locations or positions of the preselected facial image.

The term "corresponding regions" may be used in this context to refer to at least two regions, having similar characteristics and/or locations, between at least two respective images. For example, two regions, pertaining to two image data elements 20 may be referred to as "corresponding" if, after aligning the two images according to a reference geometry, they include one or more pixels, located at the same location in the two images, or if they depict the same facial features or organs (e.g., pupil, mouth, nostril) in the two images.

According to some embodiments, system 10 may receive a plurality of image data elements 20 that may depict or pertain to the same person. FR module 30 may produce a distinctiveness map 31 for one or more (e.g., each) such image data element 20, and mapping module 110 may produce a common or averaged distinctiveness map 31' from the plurality of distinctiveness maps 31, as elaborated herein. It may be appreciated that in this example, common distinctiveness map 31' may be dedicated to the depicted person, in a sense that it may represent the distinctiveness of regions 31A of the face of the depicted person, as represented in the plurality of images (e.g., in a plurality of poses, lightings, hair do, etc.).

According to some embodiments, system 10 may include an image modification module 120. Image modification module 120 may be adapted to receive a distinctiveness map (e.g., distinctiveness map 31 and/or common distinctiveness map 31'), associating a distinctiveness score 31B to one or more regions 31A in an image data element 20 depicting a face. Image modification module 120 may select one or more regions 31A of the face, that are associated with a distinctiveness score higher than the lowest distinctiveness score 31B (e.g., not associated with the lowest distinctiveness score 31B), based on the distinctiveness map 31 and/or averaged distinctiveness map 31'. For example, image modification module 120 may select one or more top-scoring regions 31A of the depicted face, based on the distinctiveness map 31 and/or 31'.

Image modification module 120 may modify at least one of selected regions 31B, to produce one or more modified images data elements 120A. In other words, image modification module 120 may perform one or more modifications of a first image data element 20 based on distinctiveness map 31' and/or 31, to produce one or more second image data elements 120A, depicting one or more second faces 120A'.

According to some embodiments, image modification module 120 may produce the one or more second data elements 120A (and the one or more second faces 120A') by omitting one or more regions of the first face 20' that correspond to the highest scored regions 31A in distinctiveness map 110A.

Additionally, or alternatively, image modification module 120 may receive (e.g., from processor 2 of FIG. 1) a distinctiveness threshold 121, and omit or blacken-out regions 31A of face 20' that are associated with or correspond to a distinctiveness score that exceeds distinctiveness threshold 121, to produce face 120A'. In other words, image modification module 120 may select regions 31A in face 20A' that are identified as highly characterizing or distinctive of the input facial image 20' (e.g., regions having a high score 31B in distinctiveness map 31'), and blacken or mask-out the selected regions 31A to produce image 120A (and face 120A').

Additionally, or alternatively, image modification module 120 may select regions 31A in face 20A' that are identified as highly characterizing of the input facial image 20' (e.g., regions having a score 31B that exceeds distinctiveness threshold 121 in distinctiveness map 31'). Image modification module 120 may subsequently perform one or more graphical or morphological modifications to the one or more selected regions 31A of face 20' depicted in image data element 20, to produce image 120A (and face 120A'). The graphical or morphological modification may include, for example changing (e.g., increasing or decreasing) the distance between depicted facial features or organs (e.g., the distance between the eyes, distance between eyes and eyebrows, etc.), changing a depicted color (e.g., skin complexion, eye color, etc.), changing a size or proportion of a depicted facial feature or organ (e.g., thickness of lips, thickness of nose, length of nose, etc.) and the like. Other graphical or morphological modification may also be possible. As explained herein, Image modification module 120 may thus produce a dataset that includes a plurality of image data elements 120A that depicts faces 120A' upon which morphological modifications have been performed. The dataset of image data elements 120A may be utilized to train ML model 130 to recognize faces 20' that have undergone deidentification, as elaborated herein.

Additionally, or alternatively, image modification module 120 may select regions 31A in face 20A' that are identified as highly characterizing of the input facial image 20' as explained above. Image modification module 120 may subsequently blend in, or replace the one or more selected regions 31A of face 20' (e.g., a mouth) with one or more respective or corresponding regions 31A' (e.g., another mouth) of another, different face 20', represented by another image data element 20 (e.g., from a facial image repository, such as element 6 of FIG. 1). In other words, image modification module 120 may receive (e.g., from an image repository) a second image 20 depicting a face 20' and replace one or more regions 31A of the face 20' depicted in the original image data element 20, that correspond to the highest scored regions 31A in distinctiveness map 31, with corresponding regions 31A of the face depicted in the second image 20 to produce modified image data element 120A.

Image modification module 120 may thus produce a dataset that includes a plurality of image data elements 120A that depict faces 120A', from which highly distinctive regions have been omitted or extracted. As elaborated herein, system 10 may include an ML model 130, trained to recognize a face depicted in image data element 20, based on the one or more modified facial images 120A. In other words, the dataset of image data elements 120A may be utilized to train ML model 130 to recognize faces 20' that have undergone deidentification, as elaborated herein.

According to some embodiments, image modification module 120 may repeat the production of the one or more second data elements 120A in relation to a specific input image 20, applying a different modification for each repetition, to produce a training set that includes a plurality of second data elements 120A (depicting a respective plurality of modified faces 120A').

Pertaining to the same examples, image modification module 120 may blend in a mouth region from a plurality of different images 20 (e.g., from a facial image repository), to produce a corresponding plurality of image data elements 120A that originate from a specific or single input image 20 of a specific face 20'.

Additionally, or alternatively, image modification module 120 may apply or perform a one or more graphical or morphological modifications to one or more regions 31A of face 20', that correspond to the highest scored 31B regions 31A in distinctiveness map 31, so as to produce a one or more image data elements 120A, originating from input image 20.

Additionally, or alternatively, image modification module 120 may receive a plurality of image data elements 20, such as a video sequence or a plurality of separate images 20, that depict or pertain to the same person. Image modification module 120 may perform modifications on highly distinctive regions 31A (e.g., regions having a high score 31B in distinctiveness map 31') of the input facial images 20, as explained above.

It may be appreciated that in such embodiments, the subsequent training dataset (e.g., the plurality of image data elements 120A) may be used to train ML model 130 to specialize in recognizing the specific depicted face or specific person from an image 20 that has undergone deidentification.

Additionally, or alternatively, system 10 may repeat the production of the one or more second data elements 120A in relation to a plurality of input image data elements 20, to produce a plurality of image data elements 120A corresponding to, or originating from a respective plurality of input image data element 20. System 10 may thus produce a training set that includes a plurality of first data elements 20 (e.g., original images depicting a face) and/or the plurality of second data elements 120A (e.g., modified images 120, originating form original image data elements 20).

According to some embodiments, mapping module 110 may collaborate with image modification module 120 and FR 30 to include modified images 120A in the production of common distinctiveness maps 31'.

For example, embodiments of the invention may receive one or more facial images 20 depicting a face 20' pertaining to a specific person. FR module 30 may produce a distinctiveness map 31 pertaining to the one or more facial images 20, and image modification module 120 may produce a plurality of modified image data elements 120A based on the scores 31B of distinctiveness map 31, as elaborated herein. FR module 30 may then produce one or more new distinctiveness maps 31 for the one or more modified images 120A. Mapping module 110 may, in turn, average the newly produced distinctiveness maps 31, to produce a new or updated common distinctiveness map 31'. It may be appreciated that the new common distinctiveness map 31' may include, or be comprised of distinctiveness scores 31B pertaining to the one or more faces 20' of facial images 20 and/or the one or more faces 120A' of facial images 120A.

According to some embodiments, system 10 may include an ML model 130 that may be trained, based on a training set that may include at least a portion of the plurality of first data elements 20 and/or the plurality of second data elements 120, to identify or recognize a face 20' depicted in at least one incoming image data element 20 as elaborated herein.

According to some embodiments of the invention, identifying or recognizing a face may be performed by comparing between a first output of ML model 130, corresponding to a first input data element 20 (e.g., a first facial image), and one or more second outputs of ML model 130, corresponding to respective one or more second input data elements 20 (e.g., one or more second facial images). Embodiments of the invention may associate between the first data element 20 (e.g., the first facial image) and at least one second data element (e.g., at least one second facial image), so as to recognize the face of the first image data element.

According to some embodiments, ML model 130 may be trained in a supervised manner (as elaborated herein), based on a training dataset that may include at least a portion of image data elements 20 and/or image data elements 120A, to produce a representation vector 130A.

Representation vector 130A may be, or may include a low-dimension vector commonly referred to as a "latent" vector, in a "latent" vector space. Low-dimension representation vector 130A may be referred to as "latent", in a sense that it may implement or represent a mapping of high dimensional data (e.g., of an input image 20) to a lower dimensional data (e.g., the latent vector representation vector 130A) with no prior convictions of how the mapping is done, and without applying manipulations to this mapping. In other words, the ML model 130 may be trained on the training dataset for the best configuration, and the meaning or association of high dimensional data (e.g., image data element 20) to low dimensional data may be hidden from a programmer or a designer of ML model 130.

Following the training stage, during an inference or implementation stage, ML model 130 may be adapted to receive a data element 20, such as a new image data element 20, from beyond the training set. The new data element 20 may represent a first facial image 20 depicting a first face 20'. ML model 130 may be adapted to identify or recognize the first face 20' depicted in the new image data element 20, based on the training.

For example, ML model 130 may transform the new facial image data element 20 to a first latent representation vector 130A, which may represent the face 20' depicted in the new data element 20. In other words, output vector 130A may be associated with a face (e.g., of a person) depicted in face 20', and may represent an identity of the person depicted in first face 20', regardless of whether first face 20' of new data element 20 has undergone a deidentification process. According to some embodiments, ML model 130 may transform one or more second image data elements 20 (e.g., image data elements 20 of an image repository, depicting faces 20' of various people) to respective one or more second representation vectors 130A. As elaborated herein, ML model 130 may collaborate with a comparison module 140 to identify first face 20'. For example, comparison module 140 may compare first latent representation vector 130A with the second latent representation vectors 130A, and associate first face 20' with zero, one or more of the second faces 20' so as to recognize the first face 20' among the one or more second faces 20'.

As elaborated herein, image modification module 120 may omit or extract highly distinctive information, from image 20 in the process of producing image data elements 120A. In other words, image data elements 120A may be devoid of regions 31A that correspond to high distinctiveness scores 31B of original image data elements 20. Thus, a training dataset that may include one or more (e.g., a plurality) of image data elements 120A may also be devoid of regions 31A of face 20 that correspond to high distinctiveness scores 31B. It may therefore be appreciated by a person skilled in the art that ML model 130 may be trained to recognize or identify a face 20' among a plurality of faces 20' based on data that does not include, or is devoid of highly distinctive facial information.

For example, image modification module 120 may be adapted to modify face 20' by modifying or omitting at least one region 31A of face 20' that corresponds to the highest distinctiveness score value(s) 31B in distinctiveness map 31 and/or 31', to produce one or more modified image data elements 120A. ML model 130 may be trained on a training dataset that includes the one or more modified image data elements 120A. In other words, the training dataset of image data elements 120A may be devoid of the highly distinctive information of regions 31A that correspond to the highest value(s) 31B in distinctiveness map 31 and/or 31'. Therefore, ML model 130 may be trained to identify a face 20' from a plurality of faces 20', in a manner that is not dependent on the regions 31A of highest value(s) 31B in distinctiveness map 31 and/or 31'.

According to some embodiments, comparison module 140 may be adapted to compare between two output vectors 130A. For example, comparison module 140 may be adapted to receive a first output vector 130A, corresponding to a first face 20' and receive a second output vector 130A, corresponding to a second face 20', and produce an indication 140A of whether the first face 20' and second face 20' belong to the same person. According to some embodiments, the indication may be a binary indication (e.g., a 'yes' or 'no' value). Alternatively indication 140A may be a numeric value indicating a probability of identification, e.g., a percentage of certainty that first face 20' and second face 20' belong to the same person.

As depicted in FIG. 3, during a training stage, indication 140A may be used to train ML model 130 and/or comparison module 140. For example, a first data element of a first facial image 20 and a corresponding modified image 120A of a modified face 120A' (e.g., originating from first facial image 20) may produce an indication 140A confirming that the two images pertain to the identity of the same person. In a complementary manner, a first data element of a first facial image 20 and second data element including another face (e.g., that does not originate from first facial image 20) may produce an indication 140A that the two images pertain to identities of different people. These indications may be used as supervisory, or self-supervisory information to train ML model 130 and/or comparison module 140 during the training stage.

Figure 4:
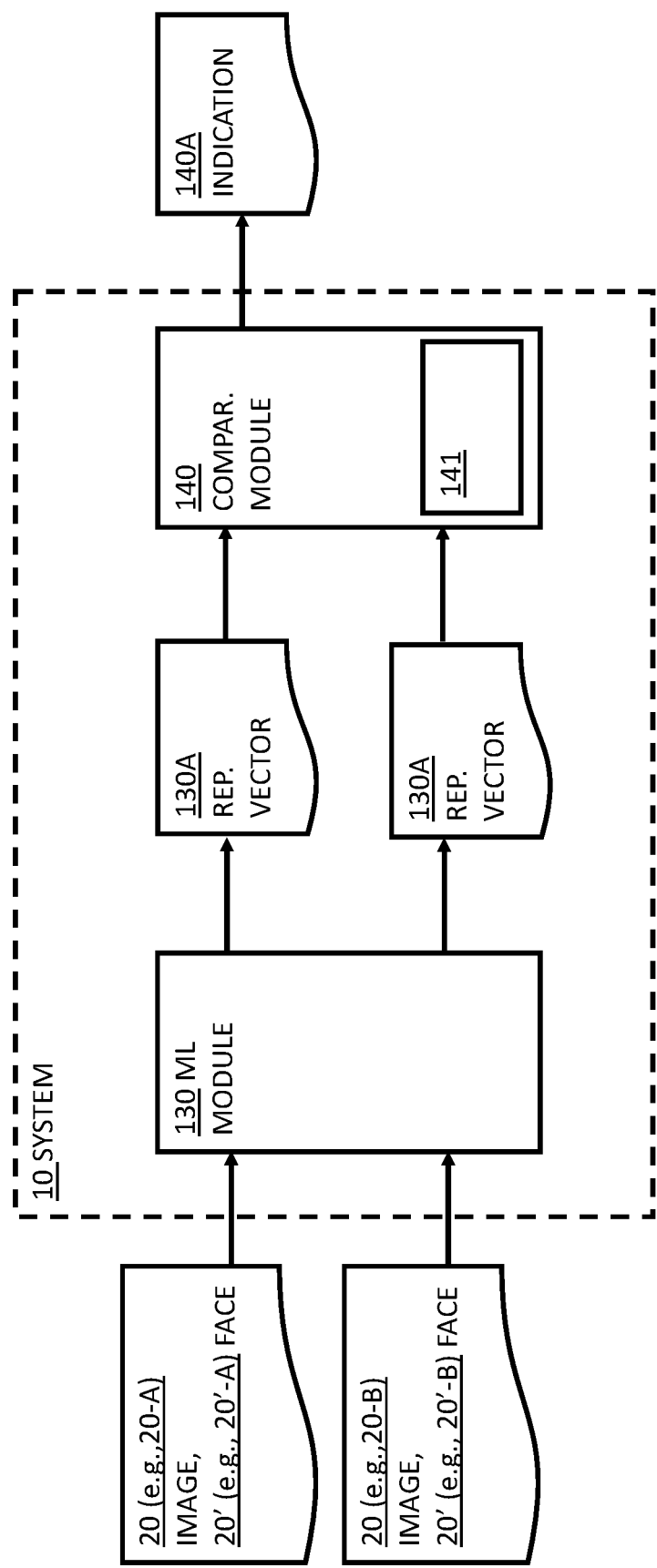
FIG. 4 is a block diagram, depicting a system for recognizing deidentified data elements such as deidentified facial images, during an inference stage, according to some embodiments.

Reference is now made to FIG. 4 which is a block diagram, depicting a system for recognizing deidentified data elements such as deidentified facial images, during an inference stage, according to some embodiments.

As shown in FIG. 4, during an inference stage, system 10 may receive two or more data elements 20 (e.g., 20-A, 20-B) from beyond the training set. The two or more data elements 20 may, for example represent respective images that include two or more respective faces 20' (e.g., 20'-A, 20'-B), such as new faces from beyond the data set.

During the inference stage, system 10 may be configured to infer the trained ML model 130 on each of the two or more image data elements 20 to produce two or more respective representation vectors 130A, where each representation vector 130A corresponds to, or represents a respective face 20' (e.g., 20'-A, 20'-B). It may be appreciated that faces 20' may depict a face of a real person, and representation vectors 130A may correspond to the identity respective people whose faces 20' are depicted in image data elements 20.

According to some embodiments, comparison module 140 may subsequently compare between two output vectors of the two or more output vectors 130A, and determine, based on the comparison, the probability that the two output vectors correspond to the same person.

In other words, during an inference stage, system 10 may receive a source image data element 20 depicting a source face 20' and one or more target image data elements 20 depicting one or more respective target faces 20'. System 10 may infer trained ML model 130 on the source image 20 to produce a source representation vector 130A, and infer trained ML model 130 on the one or more target images 20, to produce one or more respective target representation vectors 130A. Comparison module 140 may compare between the source representation vector 130A and at least one target representation vector 130A, by any appropriate metric known in the art (e.g., L1 distance, L2 distance, etc.). Based on the comparison, comparison module 140 may determine the probability that the source representation vector 130A and the at least one target representation vector 130A correspond to the same face. Additionally, or alternatively, comparison module 140 may produce an indication 140A. Indication 140A may be, or may include an identification of a target image 20 of the plurality of target image data elements 20 that most likely depicts the same face 20' as that depicted in source image data elements 20.

Figure 5:
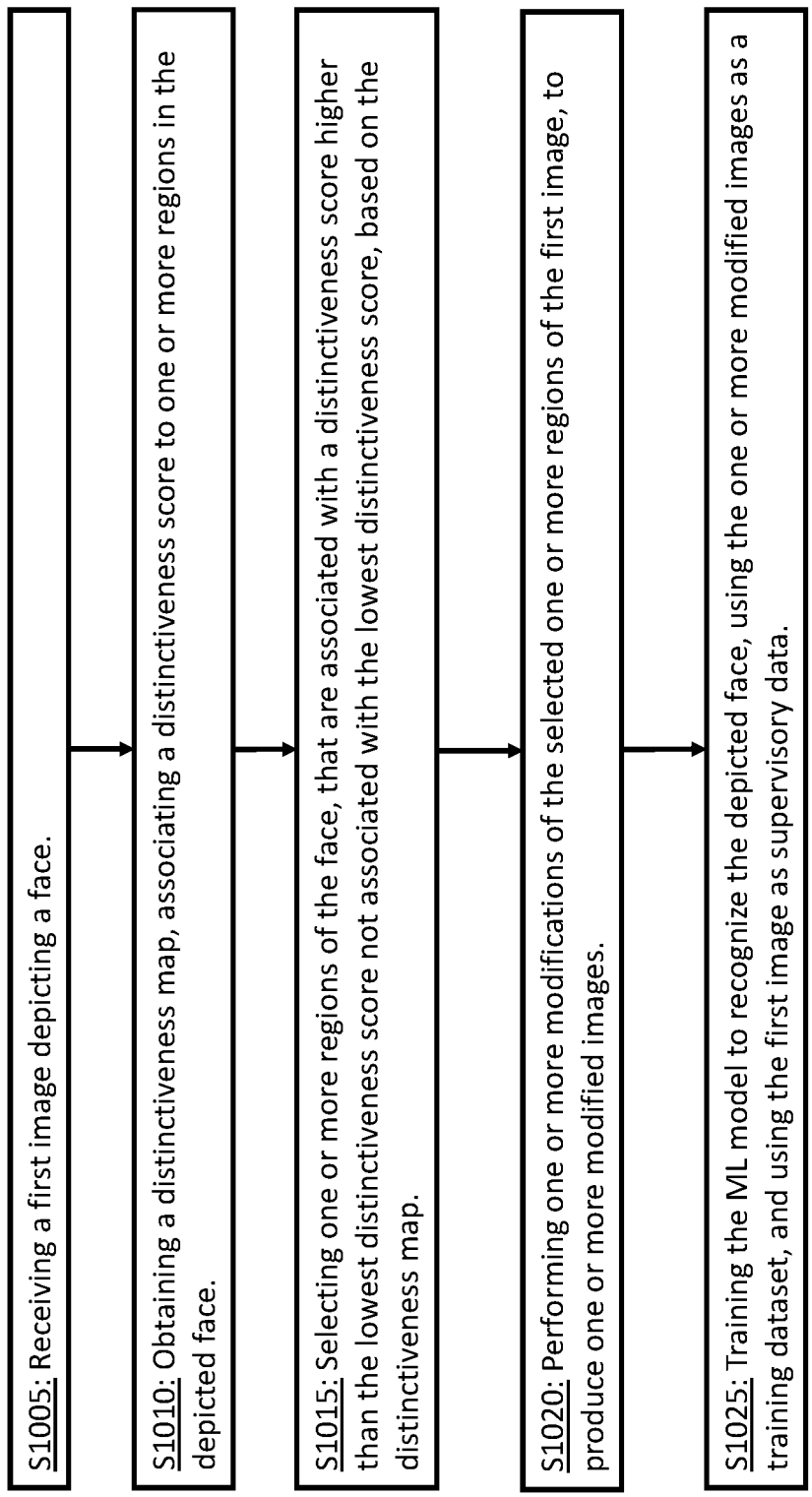
FIG. 5 is a flow diagram, depicting a method of training a machine learning model to perform facial recognition, according to some embodiments.

Reference is now made to FIG. 5 which is a flow diagram, depicting a method of training a machine learning model to perform facial recognition, by at least one processor, according to some embodiments.

As shown in step S1005, at least one processor (e.g., processor 2 of FIG. 1) may receive a first data element, such as an image data element (e.g., data element 20 of FIG. 3) depicting a face (e.g., face 20' of FIG. 3).

As shown in step S1010, processor 2 may collaborate with an FR module or algorithm (e.g., FR module of FIG. 3) to obtain a distinctiveness map (e.g., distinctiveness map 31 of FIG. 3), associating a distinctiveness score 31B to one or more regions 31B in the depicted face 20'.

As shown in step S1015, processor 2 may select one or more regions 31A of face 20', that are associated with a distinctiveness score higher than the lowest distinctiveness score 31B (e.g., not associated with the lowest distinctiveness score 31B), based on distinctiveness map 31. For example, processor 2 may select one or more top-scoring regions 31A of face 20', that correspond to distinctiveness scores 31B beyond a predefined threshold.

As shown in step S1020, processor 2 may perform one or more modifications of the selected one or more regions 31B of the first image data element 20, to produce one or more modified image data elements 120A, depicting modified versions 120A' of face 20', as elaborated herein (e.g., in relation to FIG. 3).

As shown in step S1025, processor 2 may train an ML model (e.g., ML model 130 of FIG. 3) to recognize the depicted face 20'. According to some embodiments, during the training process, processor 2 may use the one or more modified images 120A as a training dataset, and use one or more image data elements 20' as supervisory or labeling data, as elaborated herein (e.g., in relation to FIG. 3).

Figure 6:
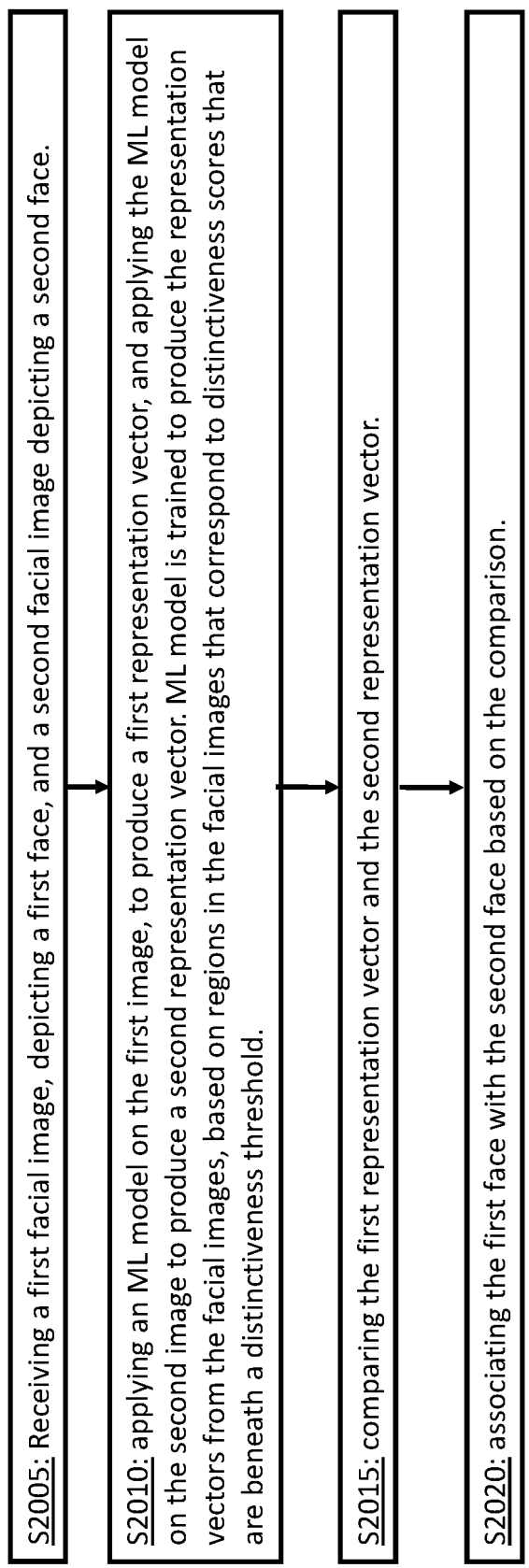
FIG. 6 is a flow diagram, depicting a method of performing FR by at least one processor, according to some embodiments of the invention.

Reference is now made to FIG. 6 which is a flow diagram, depicting a method of performing FR by at least one processor, according to some embodiments of the invention. As elaborated herein, embodiments of the invention may be used for recognizing deidentified data elements such as deidentified facial images.

As shown in step S2005, during an inference stage, the at least one processor (e.g., processor 2 of FIG. 1) may receive a first facial image data element (e.g., data element 20 of FIG. 3), depicting a first face 20', and a second facial image data element (e.g., data element 20 of FIG. 3) depicting a second face 20'.

As shown in step S2010, processor 2 may apply or infer an ML model (e.g., ML model 130 of FIG. 3) on the first image data element 20, to produce a first representation vector (e.g., representation vector 130A of FIG. 3), and apply or infer ML model 130 on the second image data element 20 to produce a second representation vector 130A. As elaborated herein (e.g., in relation to FIG. 3), ML model 130 may be trained to produce the representation vectors 130A from the facial image data elements 20, based on regions 31A in the facial images that correspond to low distinctiveness scores 31B (e.g., beneath a distinctiveness threshold). In other words, ML model 130 may be trained to produce the representation vectors 130A based on the least distinctive regions 31A (e.g., regions of lowest distinctiveness scores 31B) of faces 20' in image data element 20.

As shown in step S2010, processor 2 may employ a comparison module (e.g., comparison module 140 of FIG. 3) to compare the first representation vector 130A and the second representation vector 130A, and associate the first face with the second face based on the comparison.

For example, in some embodiments comparison module 140 may compare a representation vector 130A of a source facial image data element 20 with representation vectors 130A of one or more target facial image data elements 20, by any appropriate distance metric, as known in the art. Comparison module 140 may then associate source facial image data element 20 with a target facial image data element 20 that corresponds to the representation vector 130A of the least distance metric value.

Additionally, or alternatively, comparison module 140 may be or may include an ML-based clustering model 141, adapted to cluster representation vectors 130A, e.g., according to the identity of a depicted face, which they represent. During an inference stage, comparison module 140 may associate a representation vector 130A of an incoming source facial image data element 20 with a specific cluster of clustering model 141. Thus, comparison module 140 may associate source facial image data element 20 with a specific identity of a face 20'. Subsequently, comparison module 140 may emit an indication 140A of the identity (e.g., a name, a serial number, etc.) of a parson which source facial image data element 20 corresponds to.

As elaborated herein (e.g., in relation to FIG. 3), training of ML model 130 may include the steps of: receiving a first image data element 20 depicting a face 20'; obtaining a distinctiveness map 31, associating a distinctiveness score 31B to one or more regions 31A in the depicted face; selecting one or more regions 31A of the face, that are associated with a distinctiveness score higher than the lowest distinctiveness score 31B (e.g., not associated with the lowest distinctiveness score), based on distinctiveness map 31; performing at least one modification of the first image data element 20, to produce one or more second image data elements 120A comprising modified versions of the selected regions 31A; providing the one or more second image data elements 120A as a training dataset to ML model 130; and training ML model 130 to recognize the depicted 20' face, using the first image data element 20 as supervisory input. It may be appreciated that the elaborated process may be repeated iteratively, with a plurality of first image data elements 20, until ML model is sufficiently trained, as known in the art.

Embodiments of the invention include a practical application for performing identification or recognition of a face in a facial image data element (e.g., an image, a video stream, etc.).

Embodiments of the invention include an improvement over currently available systems and methods of FR. By finding, and specifically addressing, regions of a depicted face that are normally not targeted by face de-identification algorithms, embodiments of the invention may overcome and reversing the effect of previously applied processes of de-identification, to correctly identify a face depicted in an image.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for performing face recognition, the system comprising: a non-transitory memory device storing instruction code; and a processor associated with the memory device, and configured to execute the instruction code, whereupon execution of modules of said instruction code, the processor is configured to:
   receive a distinctiveness map, associating a distinctiveness score to one or more regions in an image depicting a first face, the distinctiveness map including a lowest distinctiveness score and one or more higher distinctiveness scores;
   select one or more regions of the first face, that are associated with a distinctiveness score higher than the lowest distinctiveness score, based on the distinctiveness map;
   modify the image at the one or more selected regions, to produce one or more modified facial images; and
   utilize a machine learning (ML) model to recognize a second face, wherein the ML model is trained to recognize the second face based on the one or more modified facial images.

2. The system of claim 1, wherein said distinctiveness score corresponds to prominence of an associated region in a process of identification of the first face by a face recognition algorithm.

3. The system of claim 1, wherein the processor is configured to receive the distinctiveness map by:
   a. identifying one or more regions in the first face;
   b. using a facial recognition system to determine a distinctiveness score of each identified region in relation to the first face; and
   c. assigning a score to each identified region, based on the distinctiveness score, to produce the distinctiveness map.

4. The system of claim 3, wherein the processor is further configured to:
   repeat steps (a) through (c) with a plurality of facial images, to obtain a respective plurality of distinctiveness maps;
   align the plurality of distinctiveness maps according to a reference geometry; and
   average the scores of corresponding regions of the plurality of distinctiveness maps, to produce an averaged distinctiveness map,
and wherein the processor is configured to select one or more regions of the first face based on the averaged distinctiveness map.

5. The system of claim 1, wherein the processor is configured to modify the image at the one or more selected regions by omitting one or more regions of the first face that correspond to the highest scored regions in the distinctiveness map.

6. The system of claim 1, wherein the processor is configured to modify the image at the one or more selected regions by:
   receiving a second image depicting a second face; and
   replacing one or more regions of the first face, that correspond to the highest scored regions in the distinctiveness map, with corresponding regions of the second face.

7. The system of claim 1, wherein the processor is configured to modify the image at the one or more selected regions by applying one or more graphical modifications to one or more regions of the first face that correspond to the highest scored regions in the distinctiveness map.

8. The system of claim 1, wherein the processor is further configured to, during an inference stage:
   receive a source image depicting a source face and one or more target images depicting one or more respective target faces;
   infer the trained ML model on the source image to produce a source representation vector;
   infer the trained ML model on the one or more target images, to produce one or more respective target representation vectors;
   compare between the source representation vector and at least one target representation vector; and
   based on the comparison, determine the probability that the source representation vector and the at least one target representation vector correspond to the same face.

9. A method of training an ML model to recognize a depicted face, the method comprising:
   receiving a first image depicting a first face;
   obtaining a distinctiveness map, associating a distinctiveness score to one or more regions in the first face, the distinctiveness map including a lowest distinctiveness score and one or more higher distinctiveness scores;
   selecting one or more regions of the first face, that are associated with a distinctiveness score that is higher than the lowest distinctiveness score, based on the distinctiveness map;
   performing one or more modifications of the selected one or more regions of the first image, to produce one or more modified images; and training the ML model to recognize the depicted face, using the one or more modified images as a training dataset, and using the first image as supervisory data.

10. The method of claim 9, wherein obtaining the distinctiveness map comprises:
   a. identifying one or more regions in the first face;
   b. using a facial recognition system to determine a distinctiveness score of each identified region in relation to the first face; and
   c. assigning a score to each identified region, based on the distinctiveness score, to produce the distinctiveness map.

11. The method of claim 10, further comprising
   repeating steps (a) through (c) with a plurality of facial images, to obtain a respective plurality of distinctiveness maps;
   aligning the plurality of distinctiveness maps according to a reference geometry; and
   averaging the scores of corresponding regions of the plurality of distinctiveness maps, to produce an averaged distinctiveness map,
and wherein selecting one or more regions of the first face is based on the averaged distinctiveness map.

12. The method of claim 9, wherein performing the one or more modifications of the selected one or more regions comprises omitting one or more regions of the first face that correspond to the highest scored regions in the distinctiveness map.

13. The method of claim 9, wherein performing the one or more modifications of the selected one or more regions comprises:
   receiving a second image depicting a second face; and
   replacing one or more regions of the first face, that correspond to the highest scored regions in the distinctiveness map, with corresponding regions of the second face.

14. The method of claim 9, wherein performing the one or more modifications of the selected one or more regions comprises applying one or more graphical modifications to one or more regions of the first face that correspond to the highest scored regions in the distinctiveness map.

15. The method of claim 9, further comprising, during an inference stage:
   receiving a source image depicting a source face and one or more target images depicting one or more respective target faces;
   inferring the trained ML model on the source image to produce a source representation vector;
   inferring the trained ML model on the one or more target images, to produce one or more respective target representation vectors;
   comparing between the source representation vector and at least one target representation vector; and
   based on the comparison, determining the probability that the source representation vector and the at least one target representation vector correspond to the same face.

16. A method of performing face recognition by at least one processor, the method comprising:
   receiving a first facial image, depicting a first face, and a second facial image depicting a second face;
   applying an ML model on the first image, to produce a first representation vector, and applying the ML model on the second image to produce a second representation vector;
   comparing the first representation vector and the second representation vector; and
   associating the first face with the second face based on the comparison, wherein the ML model is trained to produce the representation vectors from the facial images, based on regions in the facial images that correspond to distinctiveness scores that are beneath a distinctiveness threshold.

17. The method of claim 16, wherein training the ML model comprises:
   receiving a first image depicting a face;
   obtaining a distinctiveness map, associating a distinctiveness score to one or more regions in the depicted face;
   selecting one or more regions of the face, that are associated with a distinctiveness score higher than the lowest distinctiveness score, based on the distinctiveness map;
   performing at least one modification of the first image, to produce one or more second images comprising modified versions of the selected regions;
   providing the one or more second images as a training dataset to the ML model; and
   training the ML model to recognize the depicted face, using the first image as supervisory input, wherein said distinctiveness score corresponds to prominence of an associated region, in a process of identification of the face by a face recognition algorithm.

* * * * *